US009842256B2

(12) United States Patent
Krauss

(10) Patent No.: US 9,842,256 B2
(45) Date of Patent: Dec. 12, 2017

(54) DETECTION OF ASTRONOMICAL OBJECTS

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 13/943,822

(22) Filed: Jul. 17, 2013

(65) Prior Publication Data

US 2015/0023549 A1    Jan. 22, 2015

(51) Int. Cl.
*G06K 9/00* (2006.01)
*G06K 9/46* (2006.01)

(52) U.S. Cl.
CPC ......... *G06K 9/0063* (2013.01); *G06K 9/4647* (2013.01)

(58) Field of Classification Search
USPC ............ 33/268; 342/140; 348/79, 143, 169, 348/311; 378/8; 434/285; 455/428; 702/150; 705/14.41; 706/48; 707/723, 707/748; 717/127, 128
See application file for complete search history.

(56) References Cited

U.S. PATENT DOCUMENTS

| | | | | |
|---|---|---|---|---|
| 6,252,627 B1 * | 6/2001 | Frame | ................... | H04N 3/1543 348/311 |
| 7,155,031 B2 * | 12/2006 | Yanagisawa | .............. | G06T 7/20 33/268 |
| 7,953,280 B2 * | 5/2011 | Theiler | ................ | G06K 9/3241 348/700 |
| 7,995,909 B2 * | 8/2011 | Ilya | ......................... | G03B 15/16 396/95 |
| 8,418,149 B2 * | 4/2013 | Krauss | ................ | G06F 11/3636 717/127 |
| 8,422,625 B2 * | 4/2013 | Bruder | ................... | A61B 6/032 378/8 |

(Continued)

FOREIGN PATENT DOCUMENTS

WO    2009007965 A2    1/2009

OTHER PUBLICATIONS

Clements, DL.; "Computational Image Processing: A Deep Galaxy Survey"; Astrophysics Group, Imperial College, A 3rd Year Lab Module; 2000.

(Continued)

*Primary Examiner* — Xuemei Chen
(74) *Attorney, Agent, or Firm* — Mollborn Patents, Inc.; Fredrik Mollborn

(57) ABSTRACT

Methods and apparatus, including computer program products, implementing and using techniques for detecting astronomical objects. An image frame is received, which includes representations of one or more astronomical objects. The received image frame is divided into several swaths. One or more swaths are selected, which include full or partial representations of one or more astronomical objects. Each of the one or more swaths and each astronomical object represented within the one or more swaths can be designated by a base-limit pair. The base-limit pairs for the selected one or more swaths are compared with base-limit pairs for one or more corresponding swaths using a difference algorithm. A list of differences in the base-limit pairs is created.

19 Claims, 3 Drawing Sheets

(56) References Cited

U.S. PATENT DOCUMENTS

| | | | | |
|---|---|---|---|---|
| 8,447,071 | B2* | 5/2013 | Ohta | G01S 3/7867 |
| | | | | 342/140 |
| 8,582,810 | B2* | 11/2013 | Campbell | G06T 7/254 |
| | | | | 345/427 |
| 8,684,745 | B2* | 4/2014 | Chen | G09B 27/00 |
| | | | | 434/285 |
| 8,717,441 | B2* | 5/2014 | Ohta | G01S 3/7864 |
| | | | | 348/143 |
| 8,862,664 | B1* | 10/2014 | Lin | H04L 63/102 |
| | | | | 705/14.41 |
| 9,069,064 | B2* | 6/2015 | Ohta | H04N 5/225 |
| 9,124,812 | B2* | 9/2015 | Yoo | H04N 5/232 |
| 2003/0202682 | A1 | 10/2003 | Yanagisawa et al. | |
| 2008/0163176 | A1* | 7/2008 | Krauss | G06F 11/3612 |
| | | | | 717/128 |
| 2011/0047230 | A1 | 2/2011 | Mcgee | |
| 2014/0052685 | A1* | 2/2014 | Adair | G06N 5/02 |
| | | | | 706/48 |
| 2014/0125816 | A1* | 5/2014 | Ohta | G02B 27/648 |
| | | | | 348/169 |
| 2014/0128059 | A1* | 5/2014 | Tronc | H04B 7/18519 |
| | | | | 455/428 |
| 2014/0160267 | A1* | 6/2014 | Kawakami | G02B 21/244 |
| | | | | 348/79 |
| 2014/0207763 | A1* | 7/2014 | Vadrevu | G06F 17/30604 |
| | | | | 707/723 |
| 2014/0278210 | A1* | 9/2014 | Krauss | G01B 21/04 |
| | | | | 702/150 |
| 2015/0052151 | A1* | 2/2015 | Krauss | G06F 17/30595 |
| | | | | 707/748 |

OTHER PUBLICATIONS

Garrigos, J. et al.; "Acceleration of a DWT-Based Algorithm for Short Exposure Stellar Images Processing on a HPRC Platform"; Proceedings of the 2010 IEEE 18th Annual International Symposium on Field-Programmable Custom Computing Machines (FCCM 2010), pp. 113-116; 2010.

Martinez, JJ. et al.; "Hardware Acceleration on HPRC of a CNN-based Algorithm for Astronomical Images Reduction"; 2010 12th International Workshop on Cellular Nanoscale Networks and their Applications (CNNA 2010), 5pp.; IEEE; 2010.

Krauss, Kirk J.; "Range Tracking & Comparison Algorithms"; Dr. Dobb's The World of Software Development. 5 pp. Feb. 1, 2006.

* cited by examiner

DETECTION OF ASTRONOMICAL OBJECTS

BACKGROUND

The present invention relates to motion processing, and more specifically, to detection of astronomical objects. Astronomical objects are typically detected using systems such as the Wide-Field Infrared Survey Explorer, or WISE, which provide data specifically oriented toward a particular aspect, such as infrared light observations in the case of the WISE system. Astronomers typically apply simplistic algorithms, such as those from the computer graphics field, to process the incoming data and to correlate specific data (e.g. infrared readings) with other specific data, such as visible light data. In this way, astronomers can infer whether a certain object detectable in certain spectra is identifiable in other spectra and thus learn more about the object. Use of these simplistic algorithms requires manual correlation steps on the part of astronomers. Because of the high resolutions of current systems such as WISE, discovery of certain types of astronomical objects, such as those visible in only certain spectra, can be delayed or altogether unfeasible, when manual steps are required to make such a discovery.

A current problem, for example, involves differentiating between infrared light from dwarf stars and light from known objects in space. Astronomers are reviewing WISE data to investigate whether an infrared dwarf star might be part of our outer solar system. The astronomers would like to be able to identify and track such a "death star" and any heightened occurrences of comets and meteors sent in Earth's direction by its gravitational effects. Thus, improved methods of detecting and tracking astronomical objects, such as infrared dwarf stars, would be desirable.

SUMMARY

According to one embodiment of the present invention, methods and apparatus, including computer program products, are provided that implement and use techniques for detecting astronomical objects. An image frame is received, which includes representations of one or more astronomical objects. The received image frame is divided into several swaths. One or more swaths are selected, which include full or partial representations of one or more astronomical objects. Each of the one or more swaths and each astronomical object represented within the one or more swaths can be designated by a base-limit pair. The base-limit pairs for the selected one or more swaths are compared with base-limit pairs for one or more corresponding swaths using a difference algorithm. A list of differences in the base-limit pairs is created.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
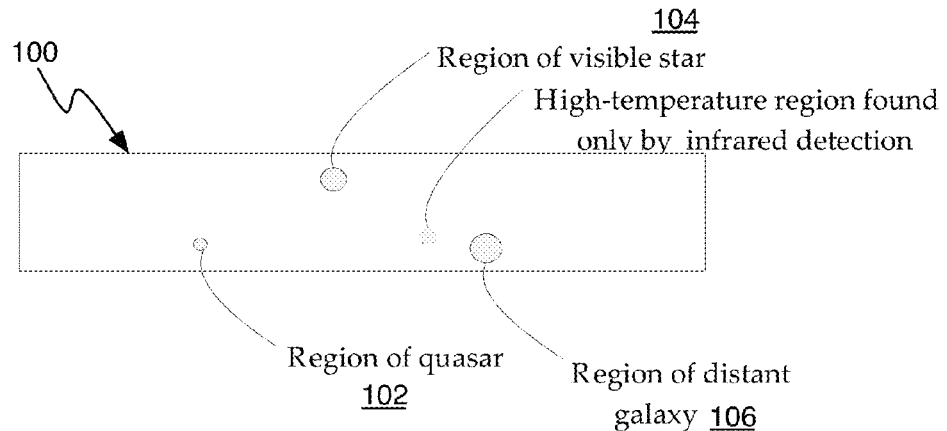
FIG. 1 shows a schematic example of a swath representing a region of space.

Typical astronomical probes, such as the WISE satellite-based system, return data in swaths. A swath can be described as a portion of an image frame that extends from one edge of the image frame to another. A region of space, as seen from a satellite's perspective, would include known astronomical objects, such as visible-light-emitting objects, as well as objects such as dwarf stars that emit only in the infrared. From this perspective, a region (100) might look something like what is illustrated in FIG. 1. As can be seen in FIG. 1, the region (100) includes a region of a quasar (102), a region of a visible star (104), and a region of a distant galaxy (106). FIG. 1 also depicts a high-temperature region, within region 100, that is found only by infrared detection. A dwarf star may be observable via WISE as such an infrared-emitting region.

Figure 2:
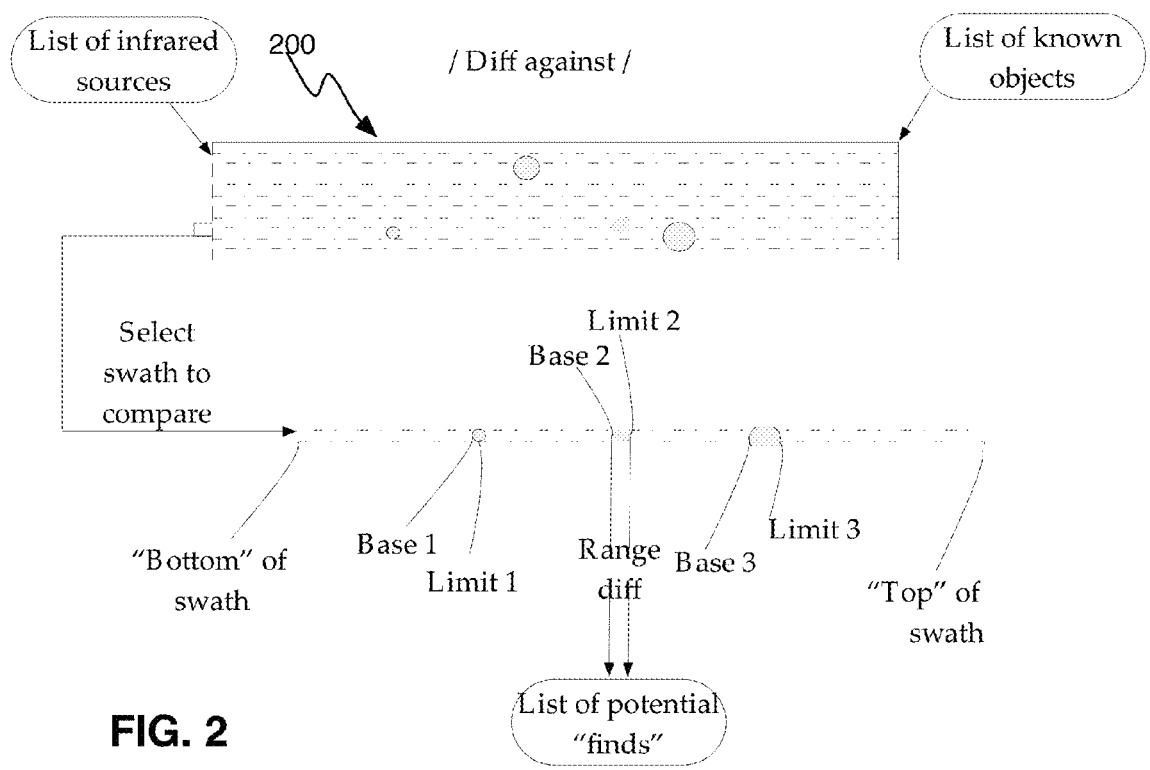
FIG. 2 shows a schematic example of a region (100) of FIG. 1 divided into several swaths (200).

The data representing the region can be divided into a series of swaths, which effectively divide the region (100) into a set of narrower horizontal patterns (200) as shown in FIG. 2. When the infrared data for a region (100) comes back from WISE, the data must be correlated against known objects that are part of an astronomical data collection, so that known objects can be recognized. Specifically infrared objects, such as the death star, can be targeted for further study through a process of elimination. Assuming swaths of data from WISE can be lined up against swaths of known data from that collection of known objects, and assuming that the perspectives taken in both data sets are sufficiently alike, then the problem is to differentiate the one data set against the other. Astronomers currently do something similar typically aided only by relatively basic software tools.

Astronomers' current practices typically do not take advantage of the insight available from current-generation entity analytics products that provide for association of observed physical entities with space and time data. Such an entity analytics product can track information related to large numbers of identified entities, such as all observable astronomical objects. The entity analytics product also can perform exact-match comparisons of specific features of those objects as provided by disparate data sources. By doing this, the entity analytics product can reveal insight about these objects and their motion.

Since astronomical objects are of varying sizes, an optimal method of correlating specifically infrared objects against the entire collection of known objects can involve discovering and tracking where each object in a region (e.g. region 100) begins and ends, and then comparing the beginnings and endings of each recognizable object as represented by different data sources. If the region is broken down into swaths, then range tracking and comparison methods applied to those swaths can provide a way to compare data originating from the different data sources. For example, one data source can be WISE and the other data source can be a set of known objects. The result of the comparison can be combined with the original data from those sources and passed into an entity analytics engine for entity resolution.

The techniques described herein, in accordance with the various embodiments, are useful for tracking and comparing any swath-based astronomical data, not only from WISE but from any set of data sources, including detectors that recognize objects in visible light, X-rays, radio frequency waves (that is, radio telescopes), microwaves, ultraviolet waves, other infrared sources (e.g. IRAS), and/or other data sources. The WISE example and dwarf star detection will be used herein by way of example to demonstrate some of the capabilities of the various techniques in accordance with the invention. For example, objects that have been determined to be only infrared objects can be reported to the entity analytics engine as occupying certain quantized spatial and/or temporal regions. The entity analytics engine can then compare the objects and their motion over time, using exact-match comparison of spacetime quanta to explore the motion of these objects. However, as the skilled person realizes, the techniques described herein are not limited to infrared versus visible light comparison, and can equally well be applied in other situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations of aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowcharts and/or block diagram block or blocks.

Figure 3:
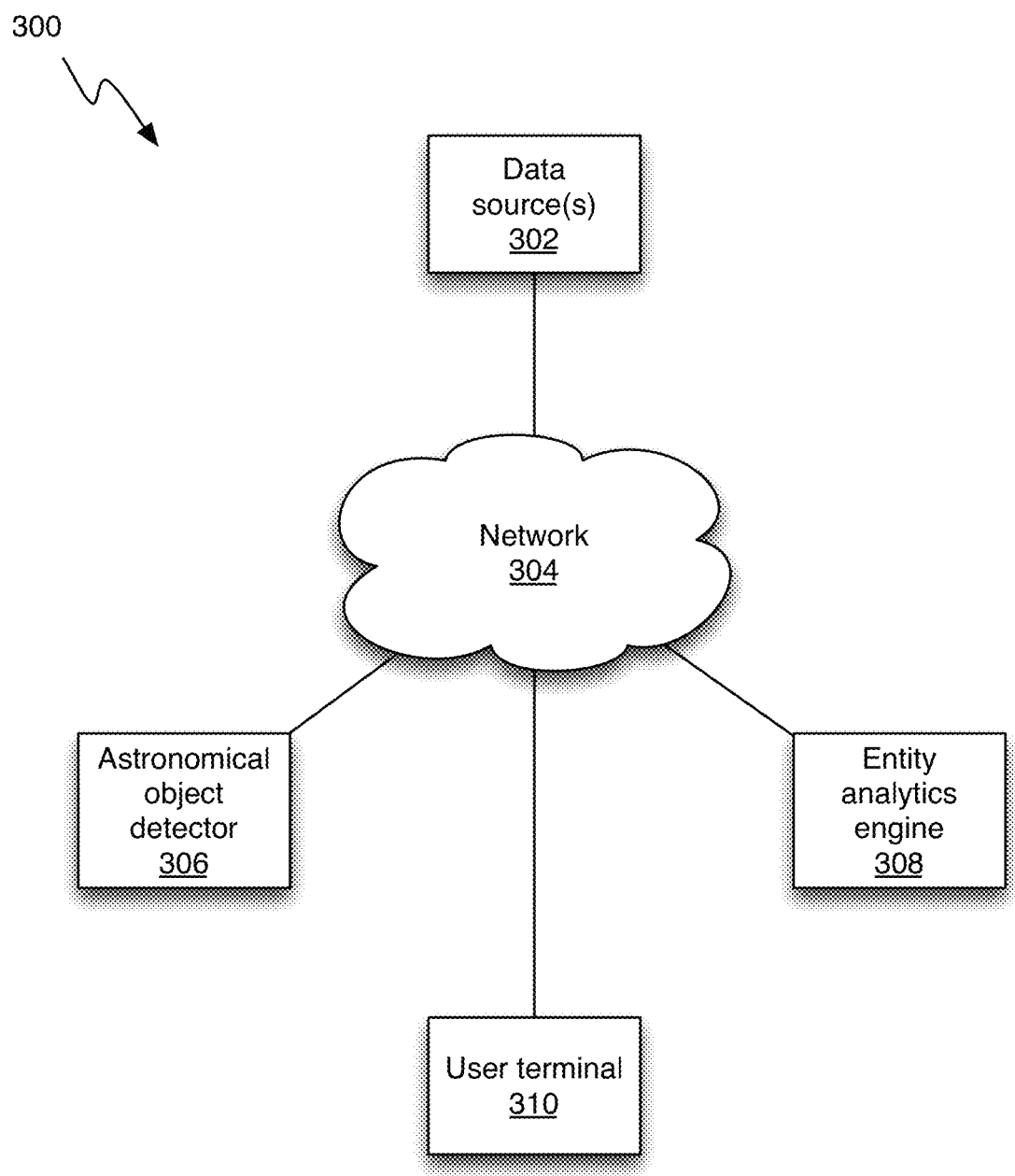
FIG. 3 shows a system (300) for detecting astronomical objects, in accordance with one embodiment.

FIG. 3 shows a system (300) for detecting astronomical objects in accordance with one embodiment of the invention. As can be seen in FIG. 3, the system includes one or more data sources (302). Some examples of data sources (302) include WISE or other detectors that can recognize objects in visible light, X-rays, radio frequency waves (that is, radio telescopes), microwaves, other infrared sources (e.g. IRAS), and/or other data sources. The data sources (302) are connected to a network (304) through which they can send information to an astronomical object detector (306). The astronomical object detector (306) uses various types of range tracking and comparison algorithms to discover astronomical objects that are visible only in specific spectra. The operation of these algorithms will be explained in further detail below with reference to FIG. 4. The astronomical object detector reports its results to an entity analytics engine (308), which correlates the data and reports a list of candidate objects to a user terminal (310). It should be noted that while all the various devices are shown in FIG. 3 as communicating through the network (304), in some embodiments, some or all of the various devices may be connected directly to each other and may exchange data directly without using the network (304).

Figure 4:
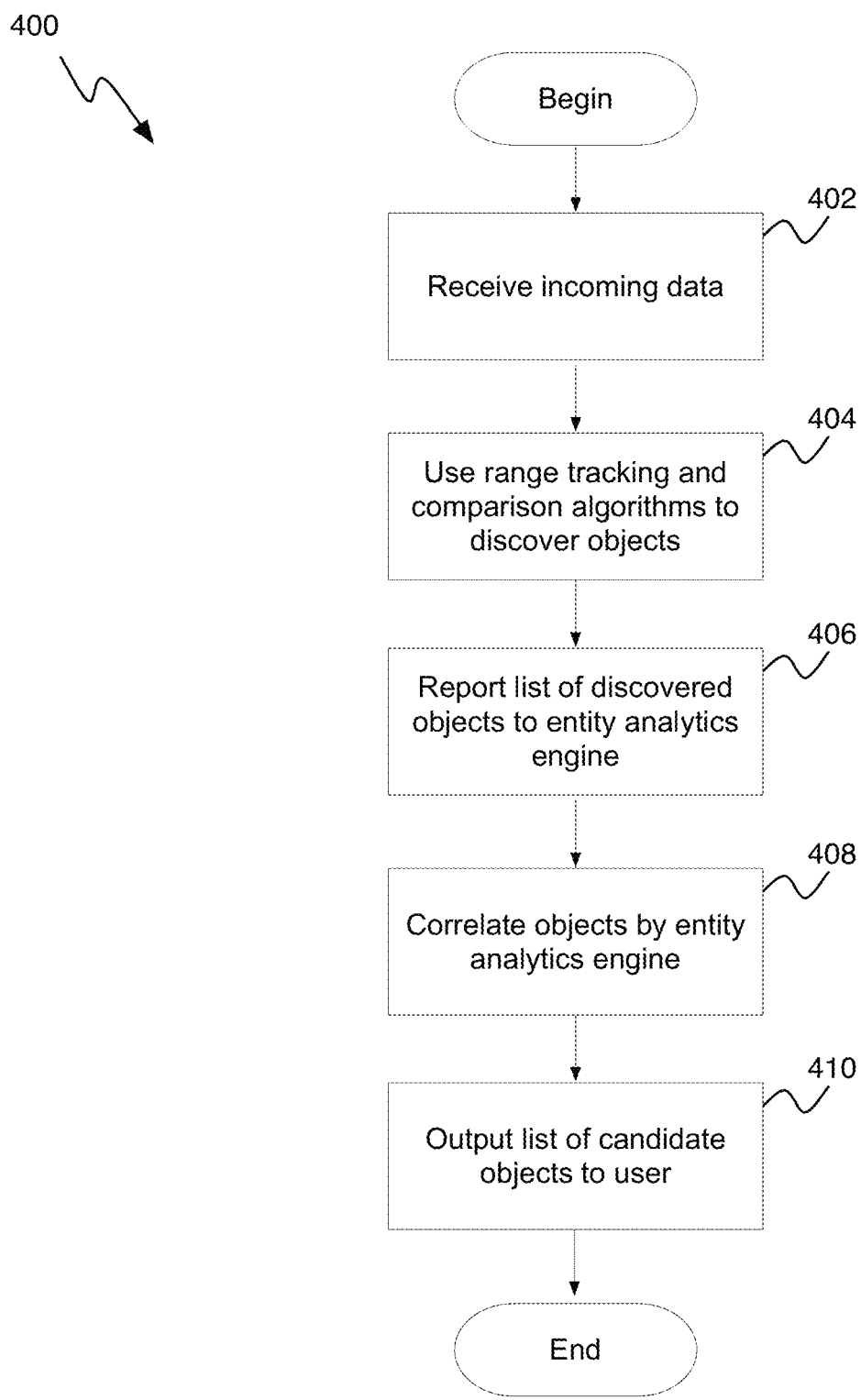
FIG. 4 shows a flowchart of a procedure (400) for detecting astronomical objects, in accordance with one embodiment.

FIG. 4 shows a flowchart illustrating the operation of the astronomical object detector (306) in accordance with one embodiment. As can be seen in FIG. 4, the operation of the astronomical object detector starts by receiving incoming astronomical data from various data sources (302) (step 402).

Next, the astronomical object detector (306) uses range tracking and comparison algorithms to discover objects (step 404) such as, for example, those objects visible only in infrared. In some embodiments, the astronomical object detector (306) can store positional data in memory and can compare the data with incoming positional data over time to detect positional changes or motion data.

For the purpose of those algorithms, items in a range can be denoted by base/limit pairs. If the data along each swath can be represented that way too, then the beginning and end of a swath can be represented as a base and limit. The range comparison algorithm can then be used to "diff" the data from WISE against the data about known objects. In one embodiment, the range comparison algorithm generates a new list of the objects that are visible only in the infrared. The same algorithm can be run to diff older lists against newer lists. In one embodiment, the result of the diff is a new list of potential finds, generated as shown in FIG. 2, that includes just those objects observable in the infrared. In one embodiment, the result of the diff is a list of just those objects observable in visible light. One example of an algorithm that can be used for this purpose is presented in "Range Tracking & Comparison Algorithms" by Kirk J. Krauss, published on Feb. 1, 2006, which is available at http://drdobbs.com/architecture-and-design/184406434.

In one embodiment, this algorithm is designed to read, traverse, and produce not just ordinary linked lists, but skiplists. Skiplists, which are familiar to those of ordinary skill in the art, provide a fast approach for looking up a given item and then walking sequentially from there. This is a suitable approach for finding a dwarf star by searching for an interesting swath (e.g. one with objects in it) and then combing the next few swaths to check for the sort of repeating patterns likely to occur if a dwarf star is big enough to show up in more than just one swath.

Next, the identified objects are reported by the astronomical object detector (306) to an entity analytics engine (308) (step 406). The astronomical object detector (306) can send reports via sockets or other interprocess communication methods or can run as an operator in a data stream mining system such as IBM InfoSphere Streams™. In some embodiments, when positional data is stored in memory, the reports can include positional changes resulting from the comparison of older and newer data sets. In some embodiments, the data in the reports can be quantized into generalized spacetime regions suitable for exact-match comparison by the entity analytics engine (308).

After receiving reports of the identified objects, the entity analytics engine (308) correlates objects based not only on their motion data, but also their other features (such as sizes, luminosities, etc.) (step 408). By way of example, the entity analytics product performs entity analytics by associating entities (such as ships) with their features (such as loads) and feature elements (such as items and tonnages). When the entities are astronomical objects, rather than ships, then the entity analytics product can treat the entities' sizes and luminosities, among other aspects, as features. The entity analytics product also can treat observations that come in from different data sources and/or at different times as distinct entities. It may then resolve those distinct entities to be one and the same entity if certain criteria are met, such as sufficient similarity (i.e. within a specified margin of error) in the locations, observation times, sizes, luminosities, or other features of the observed entities. It thus correlates astronomical objects by their features as observed via the different data sources.

Finally, the entity analytics engine (308) outputs a list of candidate objects to a user terminal (310) (step 410), which ends the process (400). The list of candidate objects might, for example, represent candidate death star objects for further study by astronomers.

In some embodiments, the entity analytics engine receives data streams from two sources, both of which provide image frame data over time, representing astronomical objects of different sizes and luminosities. The data from one source depicts objects not necessarily visible in the other source, and vice-versa. Ongoing results of repeatedly applying a "diff" algorithm to the two data sets are provided to an entity analytics engine programmed to resolve objects of similar sizes and luminosities that move within a predetermined distance over a specified time interval. That is, the entity analytics engine determines such objects to be one and the same entity. Further, in one embodiment, such objects are flagged to the user of the entity analytics engine if they are observable via a specific one of the data sources but not the other. Given this embodiment, if, for example, a set of five resolved entities was observed specifically in the data from that designated source, then the entity analytics engine would provide output flagging those five resolved entities as astronomical objects of interest for further research by astronomers using this embodiment. The astronomers could then focus their research efforts on those five objects rather than extend their research to tackle all the other, presumably myriad objects that are observable via those data sources.

The foregoing example is of course not intended to limit the invention to the use of merely two data sources, or to the detection of objects whose observable features include only sizes, locations, times, or luminosities, or to the criteria in general according to which an entity analytics engine might flag an astronomical object as significant or of particular interest to researchers, or to the number of observable astronomical objects that might be flagged as significant in accordance with the present invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, alternatives to swaths might include breaking the frame into regions that do not extend from edge to edge, or applying the techniques described herein frame by frame to an area of the sky. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for detecting astronomical objects, comprising:
   receiving, from a detector operable to capture images of astronomical objects in a first range of the electromagnetic wave spectrum, an image frame including representations of one or more astronomical objects;
   dividing the entire received image frame into a plurality of adjacent swaths having essentially identical size and shape;
   selecting one or more swaths, wherein the one or more swaths include full or partial representations of the one or more astronomical objects and wherein each swath can be designated by a unique base-limit pair, and each astronomical object represented within a swath can be designated by a unique base-limit pair;
   comparing, using a difference algorithm, the base-limit pairs for the selected one or more swaths with base-limit pairs for one or more corresponding swaths in a previously received image frame from a different detector operable to capture images of astronomical objects in a second range of the electromagnetic wave spectrum, wherein the first range is different from the second range;
   creating a list of differences in the base-limit pairs; and
   detecting one or more astronomical objects based on the list of differences in the base-limit pairs.

2. The method of claim 1, wherein the image frame represents data from a detector operable to capture images of astronomical objects observable in one or more of: visible light, X-ray, radio frequency, microwave, ultraviolet, infrared, and other electromagnetic wave spectra.

3. The method of claim 2, wherein creating a list of differences includes generating one or more lists of astronomical objects that are observable only in specified spectra.

4. The method of claim 2, further comprising flagging astronomical objects that are observable via a specific data source.

5. The method of claim 1, further comprising:
   storing positional data for objects detected in the plurality of swaths; and
   comparing the stored positional data of older swaths and newer swaths to detect positional changes of the astronomical objects.

6. The method of claim 5, wherein detecting positional changes includes:
   determining astronomical objects with similar features observed within a specified distance of one another within a specified time interval to be one and the same astronomical object.

7. The method of claim 1, further comprising:
   correlating objects using an entity analytics engine that receives data, including at least one or more of: the image frame, the selected one or more swaths, the one or more corresponding swaths, and the list of differences,
   wherein the entity analytics engine further performs one or more of: entity resolution and the detection of entities that are significant according to a criterion.

8. The method of claim 7, wherein entity resolution includes comparing features recognizable via analysis of the received data.

9. The method of claim 7, wherein entity resolution further includes determining astronomical objects with similar features observed within a specified margin of error to be one and the same astronomical object.

10. The method of claim 1, further comprising:
    searching for a swath containing full or partial representations of one or more astronomical objects; and
    combining adjacent swaths to detect patterns likely to occur when an astronomical object is sufficiently large to be partially represented in more than a single swath.

11. A computer program product for detecting astronomical objects, the computer program product comprising a non-transitory computer readable storage medium having program code embodied therewith, the program code being executable by a processor to:
    receive, from a detector operable to capture images of astronomical objects in a first range of the electromagnetic wave spectrum, an image frame including representations of one or more astronomical objects;
    divide the entire received image frame into a plurality of adjacent swaths having essentially identical size and shape;
    select one or more swaths, wherein the one or more swaths include full or partial representations of the one or more astronomical objects and wherein each swath can be designated by a unique base-limit pair, and each astronomical object represented within a swath can be designated by a unique base-limit pair;
    compare, using a difference algorithm, the base-limit pairs for the selected one or more swaths with base-limit pairs for one or more corresponding swaths in a previously received image frame from a different detector operable to capture images of astronomical objects in a second range of the electromagnetic wave spectrum, wherein the first range is different from the second range;
    create a list of differences in the base-limit pairs; and
    detect one or more astronomical objects based on the list of differences in the base-limit pairs.

12. The computer program product of claim 11, wherein the image frame represents data from a detector operable to capture images of astronomical objects observable in one or more of: visible light, X-ray, radio frequency, microwave, ultraviolet, infrared, and other electromagnetic wave spectra.

13. The computer program product of claim 12, wherein creating a list of differences includes generating one or more lists of astronomical objects that are observable only in specified spectra.

14. The computer program product of claim 11, further comprising program code executable by the processor to:
store positional data for objects detected in the plurality of swaths; and
compare the stored positional data of older swaths and newer swaths to detect positional changes of the astronomical objects.

15. The computer program product of claim 14, wherein detecting positional changes includes:
determining astronomical objects with similar features observed within a specified distance of one another within a specified time interval to be one and the same astronomical object.

16. The computer program product of claim 11, further comprising program code executable by the processor to:
correlate objects using an entity analytics engine that receives data, including at least one or more of: the image frame, the selected one or more swaths, the one or more corresponding swaths, and the list of differences,
wherein the entity analytics engine further performs one or more of: entity resolution and the detection of entities that are significant according to a criterion.

17. The computer program product of claim 16, wherein entity resolution further includes determining astronomical objects with similar features observed within a specified margin of error to be one and the same astronomical object.

18. The computer program product of claim 11, further comprising program code executable by the processor to:
search for a swath containing full or partial representations of one or more astronomical objects ; and
combine adjacent swaths to detect patterns likely to occur when an astronomical object is sufficiently large to be partially represented in more than a single swath.

19. A system for detecting astronomical objects, comprising:
an astronomical object detector; and
an entity analytics engine coupled to the astronomical object detector,
wherein the astronomical object detector includes a processor and a non-transitory computer readable storage medium having program code embodied therewith, the program code being executable by the processor to:
receive, from a detector operable to capture images of astronomical objects in a first range of the electromagnetic wave spectrum, an image frame including representations of one or more astronomical objects;
divide the entire received image frame into a plurality of adjacent swaths having essentially identical size and shape;
select one or more swaths, wherein the one or more swaths include full or partial representations of the one or more astronomical objects and wherein each swath can be designated by a unique base-limit pair, and each astronomical object represented within a swath can be designated by a unique base-limit pair;
compare, using a difference algorithm, the base-limit pairs for the selected one or more swaths with base-limit pairs for one or more corresponding swaths in a previously received image frame from a different detector operable to capture images of astronomical objects in a second range of the electromagnetic wave spectrum, wherein the first range is different from the second range;
create a list of differences in the base-limit pairs; and
send the list of differences to the entity analytics engine;
wherein the entity analytics engine includes a processor and a non-transitory computer readable storage medium having program code embodied therewith, the program code being executable by the processor to:
receive data, including at least one or more of the image frame, the selected one or more swaths, the one or more corresponding swaths, and the list of differences from the astronomical object detector;
correlate the objects represented by the received data by performing one or more of entity resolution and the detection of entities that are significant according to a criterion; and
generate a report of one or more of the resolved entities or the significant entities.

* * * * *